United States Patent [19]
Tyree

[11] Patent Number: 5,369,797
[45] Date of Patent: Nov. 29, 1994

[54] RADIO ALARM CLOCK WITH REMOVABLE CASSETTE PLAYER/RECORDER

[76] Inventor: James G. Tyree, 470 Palm, Deland, Fla. 32724

[21] Appl. No.: 846,125

[22] Filed: Mar. 4, 1992

[51] Int. Cl.$^5$ .......................... H04B 1/08; G04C 21/14
[52] U.S. Cl. ................................... 455/349; 455/344; 455/351; 368/10; 368/63
[58] Field of Search ............... 455/231, 346, 344, 348, 455/349, 171; 368/10, 12, 63, 244, 250, 254; 369/22, 23

[56] References Cited

U.S. PATENT DOCUMENTS

| | | | |
|---|---|---|---|
| 3,611,151 | 10/1971 | Fernandez | 455/344 |
| 3,644,682 | 2/1972 | Parilla | 369/23 |
| 4,498,787 | 2/1985 | Jung-Sun | 368/10 |

*Primary Examiner*—Curtis Kuntz
*Assistant Examiner*—Thanh C. Le
*Attorney, Agent, or Firm*—Paul S. Rooy

[57] ABSTRACT

A radio alarm clock with removable cassette player/recorder is powered by a rechargeable battery which is recharged when the removable cassette player/recorder is installed on the radio alarm clock. The radio and the cassette player/recorder may be played independent of the clock. Five wakeup modes are disclosed: tone only, radio only, cassette player/recorder only, tone then cassette player/recorder and radio then cassette player/recorder. The cassette player/recorder may be removed from the radio alarm clock so that it may be used as an electronic memo pad; the messages dictated to it during the course of a day may be replayed the following morning when the alarm clock activates the cassette player/recorder. When installed on the radio alarm clock the cassette player/recorder plays back through the larger radio alarm clock amplifier and speaker.

4 Claims, 2 Drawing Sheets

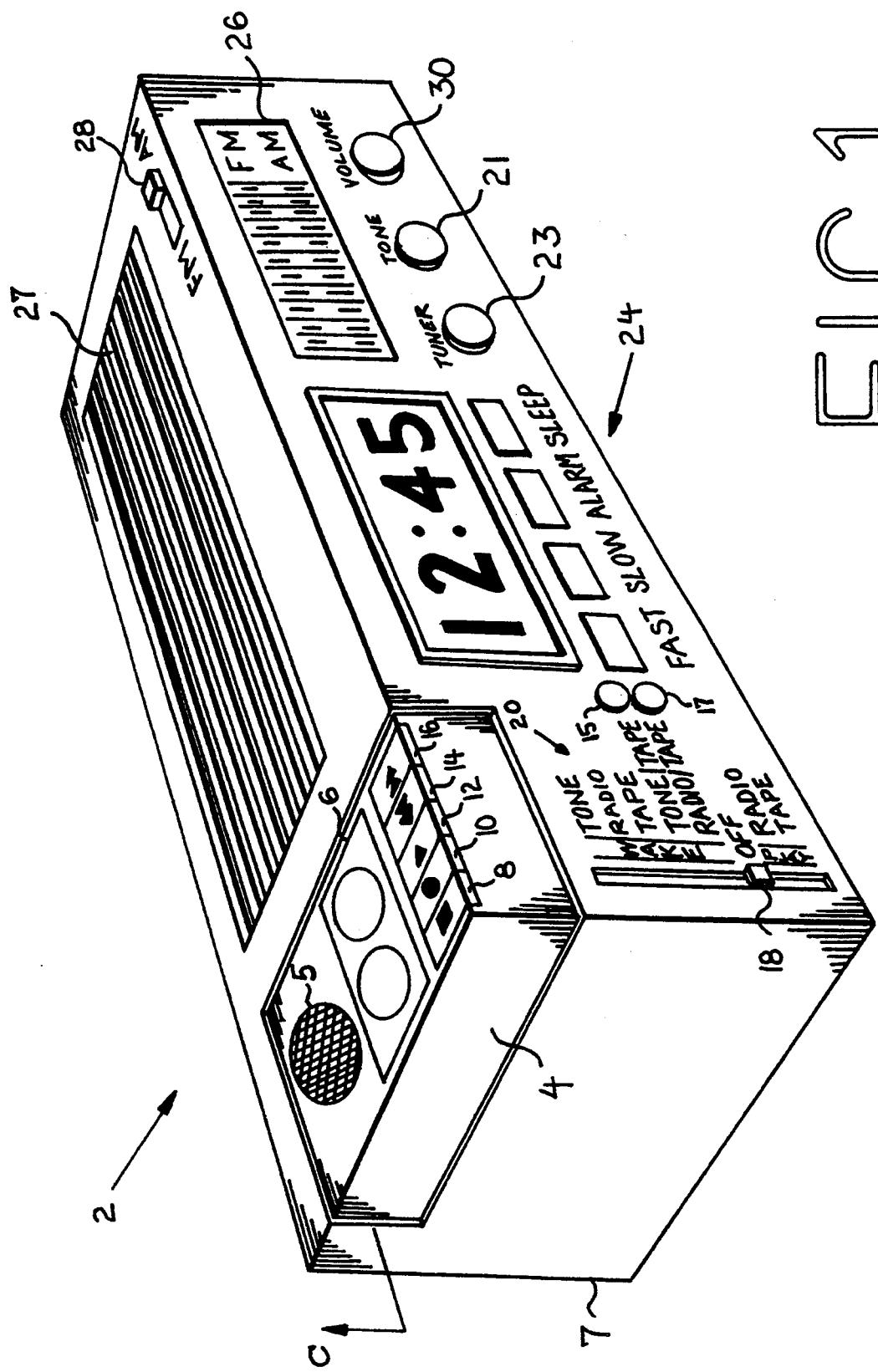

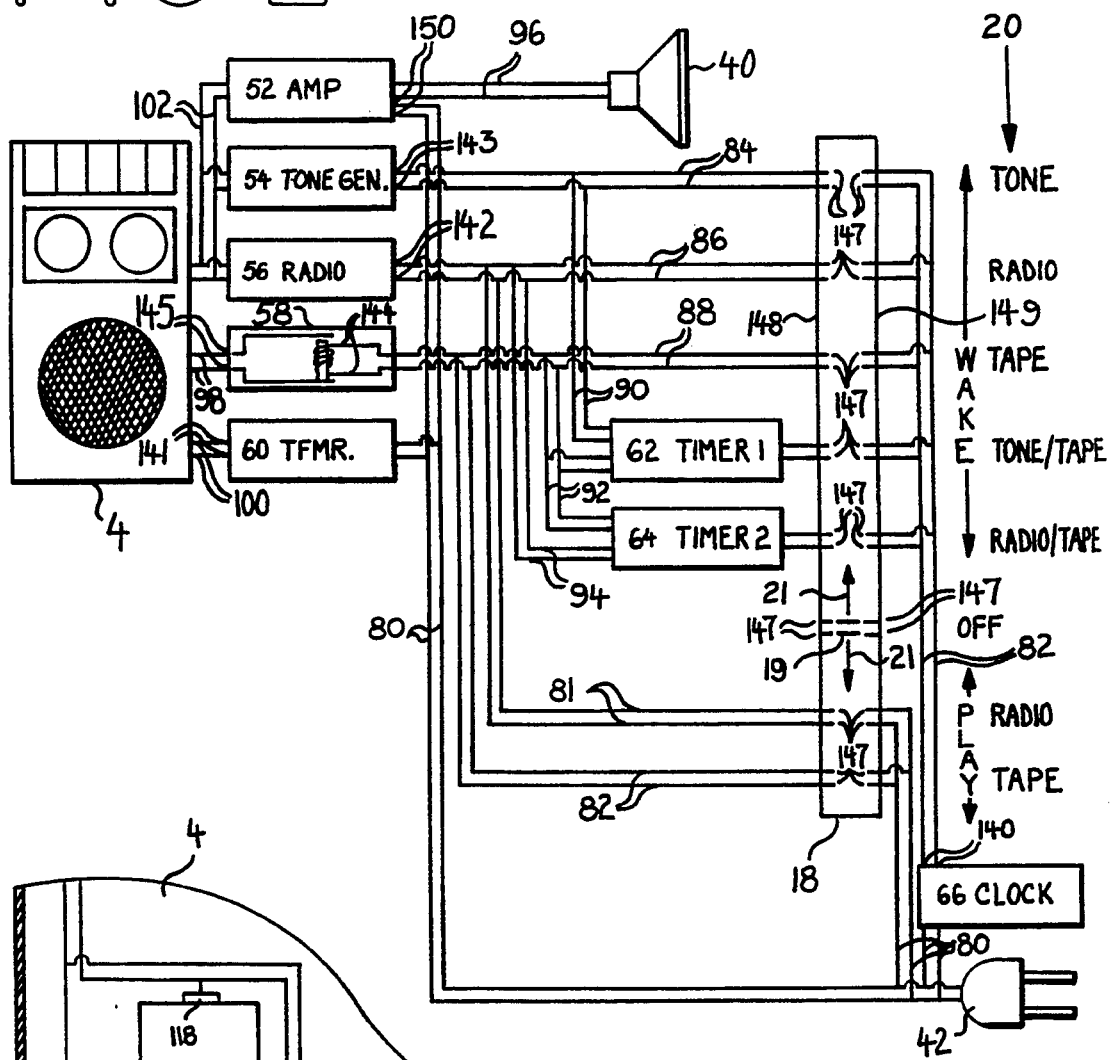
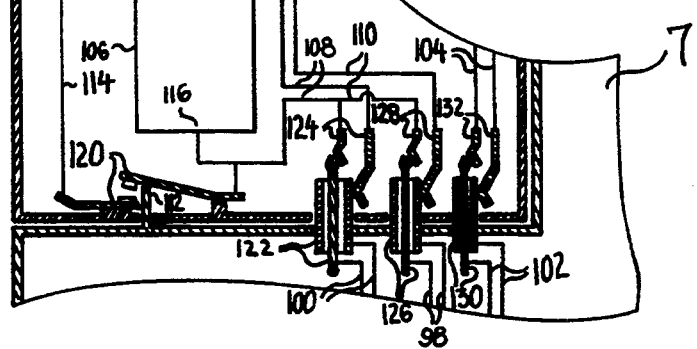

RADIO ALARM CLOCK WITH REMOVABLE CASSETTE PLAYER/RECORDER

| CROSS REFERENCE TO RELATED APPLICATIONS | | |
|---|---|---|
| 4,405,241 | Aihara et al. | Electronic Device Having Timepiece Function |
| 4,119,813 | Sato | Cassette Tape Recorder With Detachable Coupling to Radio |
| 3,611,151 | Fernandez | Clock Radio With Tape Player |
| 3,376,700 | Davis et al. | Tape Recorded Chime Clock |

BACKGROUND OF THE INVENTION

1. Field of the Invention

The present invention relates to alarm clocks and in particular to an alarm clock radio capable of activating a removable cassette tape recorder/player.

2. Background of the Invention

The manner in which we wake has a significant impact on the rest of the day. Much work and thought has been invested in designing ways to render the waking process as painless as possible. Alarm clocks have been devised which employ pleasant sounds to mark the passage of time or to wake people up. Other alarm clocks exist which will turn on a radio tuned to a predetermined station in order to wake a sleeping person. Still other radio alarm clocks incorporate a tape player wherein the tape player may be activated by the alarm clock in order to wake a sleeping individual.

A problem exists in that no currently available alarm clock radio tape player exists which will wake a sleeping individual and then deliver a prerecorded message to that individual. The prerecorded message might consist of the day's schedule, things to remember to do, etc.. Were an individual to receive such a message immediately after waking, that individual would then be in a much better position to mentally plan his day while executing his customary toilet, while eating breakfast, etc., thereby becoming better prepared to meet the challenges the day may bring.

Further, no currently available radio alarm clock tape player provides for a small, easily transported electronic memo pad (such as a small cassette tape recorder) into which an individual might dictate the messages he wishes to hear when he wakes the following morning. This electronic memo pad would benefit its user by being powered by an easily and conveniently rechargeable battery as well as being equipped with a user friendly and convenient interface with the radio alarm clock to enable the electronic memo pad to replay its messages on the command of the radio alarm clock. The system's utility would be increased by retaining the capability of waking functions wherein an individual could be waked using a prerecorded tape (music, motivational, etc.).

DESCRIPTION OF THE PRIOR ART

A number of patents exist for timepieces which have been combined with recording devices.

U.S. Pat. No. 4,045,241 was granted Aihara et al. for a solid state timepiece capable of recording a plurality of messages and playing them back at predetermined times. Since Aihara used solid state recording, the length of each message was limited by the storage space available in the semiconductor memory. In addition prerecorded audio cassettes could not be used in this system.

Sato was granted U.S. Pat. No.4,119,813 for a small cassette tape recorder removably mounted on a radio. No alarm clock function was disclosed in this case.

While Fernandez disclosed a radio alarm clock with tape player in U.S. Pat. No. 3,611,151, no convenient means to record messages was taught. In addition, no provision was disclosed to provide a means to wake the individual prior to initiating the tape playback function.

In U.S. Pat. No. 3,376,700 Davis et al. disclose a timepiece having a tape recorded chime. No radio is taught and no means to record messages to be played back on the command of the timepiece is disclosed.

SUMMARY OF THE INVENTION

Accordingly, it is an object of this invention to provide a radio alarm clock with removable cassette player/recorder capable of waking sleeping individuals by means of a tone, the radio or by playing the tape recorder.

It is another object of this invention to provide a radio alarm clock with removable cassette player/recorder capable of waking the sleeping individual by sounding the wakeup tone or playing the radio for a predetermined time prior to commencing tape recorder playback operation.

It is still another object of this invention to provide a radio alarm clock with removable cassette player/recorder whose tape recorder is easily removable and transportable, and which is easily reinstalled on the radio alarm clock.

It is another object of this invention to provide a radio alarm clock with removable cassette player/recorder such that when the cassette player/recorder is installed on the radio alarm clock, the battery in the cassette player/recorder will be recharged by a transformer contained in the radio alarm clock, and the signal played back by the cassette player/recorder will be amplified by the amplifier in the radio alarm clock and projected by the speakers contained in the radio alarm clock, whereby superior sound quality will be produced.

It is a further object of this invention to provide a radio alarm clock with removable cassette player/recorder whose radio and tape recorder may be played independent of the clock.

It is still a further object of this invention to provide a radio alarm clock with removable cassette player/recorder which is economical to manufacture.

BRIEF DESCRIPTION OF THE DRAWINGS

The invention, together with the other objects, features, aspects and advantages thereof will be more clearly understood from the following in conjunction with the accompanying drawings.

Two sheets of drawings are provided. Sheet one contains FIG. 1. Sheet two contains FIGS. 2 and 3.

FIG. 1 is a front isometric view of the radio alarm clock with removable cassette player/recorder.

FIG. 2 is a schematic of the electrical circuit contained in the radio alarm clock with removable cassette player/recorder.

FIG. 3 is a cross sectional view of the interface between the cassette player/recorder and the radio alarm clock taken at section C of FIG. 1.

DETAILED DESCRIPTION OF THE PREFERRED EMBODIMENT

Referring now to FIG. 1 we can see a radio alarm clock with removable cassette player/recorder 2. The cassette player/recorder 4 is in the installed position on radio alarm clock 7.

Cassette player/recorder 4 has cassette player/recorder speaker 5, cassette door 6, stop/eject control 8, record control 10, play control 12, rewind control 14 and fast forward control 16.

Radio alarm clock 7 has speaker grill 27, radio mode switch 28, radio display 26, volume control 30, tone control 21, radio tuning control 23, clock controls 24, function switch 18, function indicia 20, timer 1 wakeup time control 15 and timer 2 wakeup time control 17.

Referring to FIG. 2 we can observe a schematic of the electric wiring of the radio alarm clock with removable cassette player/recorder 2.

Plug 42 is inserted into a standard wall outlet. Power lines 80 carry electricity to clock 66, function switch 18 and transformer 60. When cassette player/recorder 4 is installed on radio alarm clock 7, transformer 60 constantly charges rechargeable battery 106 contained in cassette player/recorder 4 (see FIG. 3).

Function switch 18 is a double pole slide switch comprising eight pairs of poles 147 on its first side 148, eight pairs of poles 147 on a second, opposite side 149 with each pair of poles 147 having a pole pair 147 directly opposite it, and a sliding double pole bridge 19 capable of electrically connecting one set of two opposite pole pairs 147 at a time.

Bridge 19 may be moved as indicated by arrows 21 to different positions within function switch 18. If we wished to play radio 56, bridge 19 would be positioned at the "RADIO" mark of function indicia 20 thus sending power from lines 80 through bridge 19 and thence through radio bridge lines 81 and radio lines 86 to radio power input 142. The unamplified radio signal is then sent through amplifier lines 102 to amplifier 52. The power input 150 of amplifier 52 is electrically connected to power lines 80. The amplified radio signal is then sent through speaker lines 96 to speaker 40.

Similarly, if we wished to play the cassette player/recorder 4, we would position bridge 19 at the "TAPE" mark of function indicia 20, thus sending electricity from power lines 80 bridge 19, tape bridge lines 82 and tape lines 88 to tape solenoid actuation coil 144.

Normally open tape solenoid 58 closes, electrically connecting solenoid switch terminals 145 and making the connection between rechargeable battery terminal 116 and tape power line 114, thus providing power to the cassette player/recorder 4. The unamplified cassette player/recorder signal source sends the unamplified cassette player/recorder signal from the cassette player/recorder 4 through amplifier lines 102 to amplifier 52, whose amplified signal is sent through speaker lines 96 to speaker 40. In this way the tape sound is amplified and projected by the larger and better quality amplifier and speaker contained in the radio alarm clock, thereby attaining better quality sound. An optional embodiment of female audio jack 132 would be for female audio jack 132 to include a cutoff feature that would disconnect cassette player/recorder speaker 5 when cassette player/recorder 4 is installed on radio alarm clock 7.

Five wake functions are available. When a predetermined wake time (set by means of clock controls 24) is reached, clock sends electricity out clock output 140 and through clock command lines 82.

If we wished to wake to a simple tone, we would position bridge 19 opposite the "TONE" mark of indicia 20. At the predetermined time clock 66 would send electricity out clock output 140 and through clock command lines 82, bridge 19 and tone lines 84 to tone generator power input 143. The unamplified signal from tone generator 54 would then be sent to amplifier 52 through amplifier lines 102. The amplified signal from amplifier 52 would then be sent to speaker 40 through speaker lines 96.

If we wished to wake to radio 56, at the predetermined time clock 66 would send electricity out clock output 140, through clock command lines 82, bridge 19 and radio lines 86 to radio power input 142. The unamplified radio signal would travel through amplifier lines 102 to amplifier 52. From amplifier 52 the amplified radio signal would be transmitted to speaker 40 through speaker lines 96.

If we wished to wake to the cassette player/recorder 4, at the predetermined time clock 66 would send electricity out clock output 140, through clock command lines 82, bridge 19 and tape lines 88 to tape solenoid actuation coil 144. Normally open tape solenoid 58 would close, making the circuit between rechargeable battery terminal 116 and tape power line 114 (see FIG. 3), initiating tape playback (granted play control 12 was depressed).

The radio alarm clock with removable cassette player/recorder 2 provides for two functions wherein the sleeping individual waked prior to initiating tape playback.

In the TONE/TAPE wakeup mode, clock 66 sends electricity at the predetermined time through clock command lines 82 and bridge 19 to timer 1 62. Timer 1 62 sends electricity for a predetermined period of time through timer 1 tone lines 90 and tone lines 84 to tone generator power input 143, and tone generator 54 sends an unamplified tone signal through amplifier lines 102 to amplifier 52, where the unamplified tone signal is amplified and transmitted to speaker 40 through speaker line 96.

At the conclusion of the predetermined time period (calculated to be long enough in duration to allow the sleeper to awaken, and set by means of timer 1 wake time control 15), timer 1 62 routes the electricity from clock 66 through timer tape lines 92 and tape lines 88 to tape solenoid actuation coil 144. Normally open solenoid 58 closes, thereby making the circuit between rechargeable battery terminal 116 and tape power line 114. Granted cassette player/recorder 4 has been left in the PLAY position by depressing play control 12, cassette player/recorder 4 will now start to play.

The RADIO/TAPE wakeup mode operates the same as the above described TONE/TAPE mode, except that at the predetermined time, electricity flows from clock 66 through clock command lines 82 and bridge 19 to timer 2 64. Timer 2 64 allows electricity to flow for a predetermined period of time (once again, long enough to wake the sleeper, and set by using timer 2 wake time control 17) through timer 2 radio lines 94 and radio lines 86 to radio power input 142. Radio 56 sends an unamplified radio signal through amplifier lines 102 to amplifier 52, where said radio signal is amplified and sent to speaker 40 through speaker lines 96. After the predetermined time period has passed, timer 2 64 routes the electricity from clock 66 through timer tape lines 92 and tape lines 88 to tape solenoid 58. Tape solenoid 58 closes, activating cassette player/recorder 4 as in the case of the TONE/TAPE mode.

Referring now to FIG. 3 we can see a cross sectional view of the interface between the cassette player/recorder 4 and the radio alarm clock 7, taken at section C of FIG. 1.

When cassette player/recorder 4 is installed on radio alarm clock 7 stud 112 opens switch 120, thereby cutting off power from the rechargeable battery 106 to the rest of cassette player/recorder 4. At the same time, male charging jack 122 engages with female charging jack 124, male solenoid jack 126 engages with female solenoid jack 128 and male audio jack 130 engages with female audio jack 132.

Electricity from transformer 60 flows out transformer output 141, through transformer lines 100, male charging jack 122, female charging jack 124 and battery charge lines 108 to charge rechargeable battery 106. Battery charge lines 108 are connected to terminals 116 and 118.

Solenoid switch terminals 145 are connected across rechargeable battery terminal 116 and tape power line 114 by means of tape player/recorder solenoid lines 110, female solenoid jack 128, male solenoid jack 126 and tape solenoid lines 98 such that the act of tape solenoid 58 closing makes the circuit between rechargeable battery terminal 116 and tape power line 114. One pole of female solenoid jack 128 is electrically connected to tape power line 114 and the other pole of female solenoid jack 128 is electrically connected to rechargeable battery terminal 116.

When cassette player/recorder 4 is installed on radio alarm clock 7 the unamplified cassette player/recorder signal is sent amplifier 52 through tape signal lines 104, female audio jack 132, male audio jack 130 and amplifier lines 102.

From FIG. 3 we can see how with one fast, convenient motion cassette player/recorder 4 may be installed on radio alarm clock 7, and how simultaneously the power from rechargeable battery 106 is interrupted, charging jacks 122 and 124 are engaged, solenoid jacks 126 and 128 are engaged and audio jacks 130 and 132 ace engaged.

Operation

Time set and wakeup time adjustment are performed in the standard fashion using clock controls 24. Radio tuning, volume control and tone adjustment are performed in the standard manner using radio mode switch 28, radio tuning control 23, radio display 26, volume control 30 and tone control 21.

To operate the radio independent of the clock 66, place function switch 18 opposite the "RADIO" mark in function indicia 20.

To operate cassette player/recorder 4 independent of the clock 66, place function switch 18 opposite the "TAPE" mark in function indicia 20 and use the cassette door 6 and cassette player/recorder controls 8,10,12,14 and 16 in the normal fashion.

To wake to tone or radio, place the function switch 18 opposite the "TONE" or "RADIO" mark of indicia 20.

To wake to the cassette player, rewind or fast forward the tape to the location at which it is desired that playback commence, depress play control 12 and place function switch 18 opposite the "TAPE" mark in indicia 20.

To wake to tone and then listen to cassette player/recorder 4, rewind or fast forward the tape to the location at which it is desired that playback commence and depress play control 12. Set wakeup time by adjusting timer 1 wakeup time control Position function switch 18 opposite the "TONE/TAPE" mark indicia 20.

To wake to radio 56 and then listen to cassette player/recorder 4, rewind or fast forward the tape to the location at which it is desired that playback commence, depress play control 12 and set wakeup time by adjusting timer 2 wakeup time control 17. Position function switch 18 opposite the "RADIO/TAPE" mark of indicia 20.

To use the cassette player/recorder as an electronic memo system, remove cassette player/recorder 4 from radio alarm clock 7 and carry along during the course of the day, dictating messages to be heard the following morning upon awakening. Install cassette player/recorder 4 on radio alarm clock 7. Rewind the tape to the location at which it is desired that playback commence the following morning. Set the radio alarm clock with removable cassette player/recorder to the appropriate wakeup function.

While a preferred embodiment of the invention has been illustrated herein, it is to be understood that changes and variations may be made by those skilled in the art without departing from the spirit and scope of the appending claims.

I claim:

1. A radio alarm clock with removable cassette player/recorder comprising:
   a radio alarm clock comprising:
   an electrical plug;
   a double pole slide function switch comprising:
   a first side and a second side, said sides being oppositely disposed, said sides containing eight pairs of poles each, each said pairs of poles being disposed opposite a pair of poles disposed on the opposite side of said function switch; and
   a sliding two pole bridge for connecting two of the pairs of oppositely disposed poles at a time;
   a clock electrically connected to said plug and said function switch, said clock having an output for sending electricity to said function switch at a predetermined time;
   a radio whose power input is electrically connected to said function switch;
   a tone generator whose power input is electrically connected to said function switch;
   a tape solenoid whose actuation coil is electrically connected to said function switch;
   an amplifier electrically connected to the output signal of said radio, said tone generator and to a cassette player/recorder, and whose power input is electrically connected to said plug;
   a speaker connected to said amplifier;
   a first time for routing the electricity sent from said clock output at the predetermined time from said function switch to said tone generator power input for a first adjustable period of time and thereafter to said tape solenoid actuation coil;
   a second timer for routing the electricity sent from said clock output at the predetermined time from said function switch to said radio power input for a second adjustable period of time and thereafter to said tape solenoid actuation coil;

a cassette player/recorder electrically connected to said tape solenoid; and means for quickly and easily removing said cassette player/recorder from its installed position on said radio alarm clock whereby said cassette player/recorder is used to conveniently record messages which will later be played back at the time said clock output sends electricity at the predetermined time to said function switch.

2. The radio alarm clock with removable cassette player/recorder of claim 1 wherein said function switch is electrically connected as follows:

a first pair of poles on the first side of said function switch electrically connected to said tone generator power input, a first pair of poles on the second side of said function switch electrically connected to the output of said clock and disposed opposite said first pair of poles on the first side of said function switch, a second pair of poles on the first side of said function switch electrically connected to the power input of said radio, a second pair of poles on the second side of said function switch electrically connected to the output of said clock and disposed opposite said second pair of poles on the first side of said function switch, a third pair of poles on the first side of said function switch electrically connected to the actuation coil of said tape solenoid, a third pair of poles on the second side of said function switch electrically connected to the output of said clock and disposed opposite said third pair of poles on the first side of said function switch, a fourth pair of poles on the first side of said function switch electrically connected to said first timer, a fourth pair of poles on the second side of said function switch electrically connected to the output of said clock and disposed opposite said fourth pair of poles on the first side of said function switch a fifth pair of poles on the first side of said function switch electrically connected to said second timer, a fifth pair of poles disposed on the second side of said function switch electrically connected to the output of said clock and disposed opposite the fifth pair of poles on the first side of said function switch, a sixth pair of poles on the first side of said function switch not electrically connected to anything, a sixth pair of poles on the second side of said function switch not connected electrically to anything and disposed opposite the sixth pair of poles on the first side of said function switch, a seventh pair of poles on the first side of said function switch electrically connected to the power input of said radio, a seventh pair of poles on the second side of said function switch electrically connected to said plug and disposed opposite the seventh pair of poles on the first side of said function switch, an eighth pair of poles on the first side of said function switch electrically connected to said tape solenoid actuation coil, and an eighth pair of poles on the second side of said function switch electrically connected to said plug and disposed opposite the eighth pair of poles on the first side of said function switch.

3. The radio alarm clock with removable cassette player/recorder of claim 2 wherein said means for quickly and easily removing said cassette player/recorder comprises:

a rechargeable battery having a first terminal and a second terminal which is the power source for said cassette player/recorder, said battery being electrically connected to said cassette player/recorder by means of a tape power line, a switch electrically connected between the second said terminal and said tape power line, a stud rigidly attached to said radio alarm clock such that when said cassette player/recorder is installed on said radio alarm clock said stud opens said switch, thereby disconnecting said rechargeable battery from said tape power line, a transformer electrically connected to said plug capable of recharging said rechargeable battery, a male charging jack rigidly attached to said radio alarm clock player/recorder and electrically connected to the output of said transformer, a female charging jack rigidly attached to said cassette player/recorder and electrically connected to the terminals of said rechargeable battery, said female charging jack engaging with said male charging jack when said cassette player/recorder is installed on said radio alarm clock, a male solenoid jack rigidly attached to said radio alarm clock and electrically connected with the switch terminals of said tape solenoid, a female solenoid jack rigidly attached to said cassette player/recorder and having one pole electrically connected with the second terminal of said rechargeable battery and the other pole electrically connected with said tape power line, said male solenoid jack engaging with said female solenoid jack when said cassette player/recorder is installed on said radio alarm clock, a male audio jack rigidly attached to said radio alarm clock and electrically connected to said amplifier, and a female audio jack rigidly attached to said cassette player/recorder and electrically connected to an unamplified cassette player/recorder tape signal source, said male audio jack engaging with said female audio jack when said cassette player/recorder is installed on said radio alarm clock.

4. The radio alarm clock with removable cassette player/recorder of claim 3 further comprising indicia marked on the outside of said radio alarm clock with removable cassette player/recorder, said indicia disposed adjacent said function switch, said indicia comprising:

a wake range adjacent function switch pole pairs one through five marked "WAKE", pole pairs one marked "TONE", pole pairs two marked "RADIO", pole pairs three marked "TAPE", pole pairs four marked "TONE/TAPE" and pole pairs five marked "RADIO/TAPE", "OFF" marked adjacent pole pairs six, and a play range adjacent pole pairs seven and eight marked "PLAY", pole pairs seven marked "RADIO" and pole pairs eight marked "TAPE".

* * * * *